Figure 1:
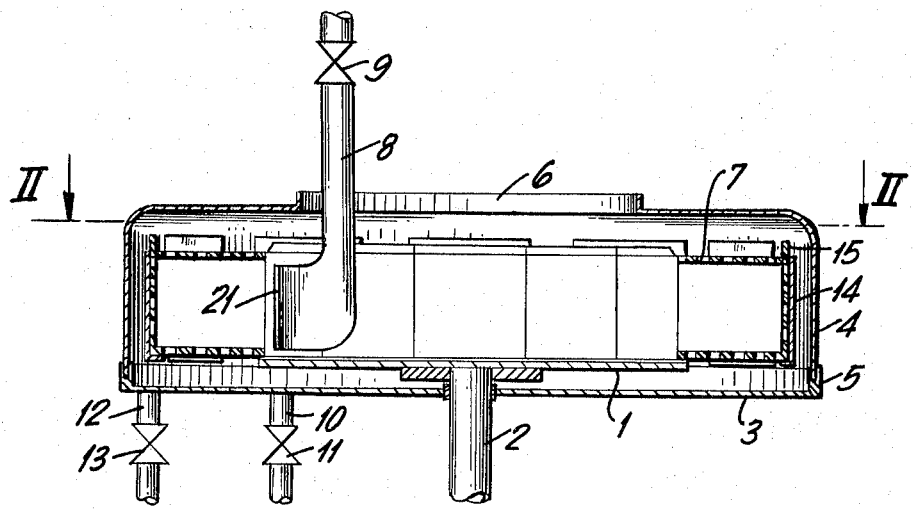

3,295,205
METHOD AND APPARATUS FOR PRODUCING CHEESE
Claes Bertil Sjöholm, Malmo, Sweden, assignor to Alfa-Laval AB, Stockholm, Sweden, a corporation of Sweden
Filed Nov. 16, 1964, Ser. No. 411,505
Claims priority, application Sweden, Nov. 22, 1963, 12,910/63
12 Claims. (Cl. 31—89)

In the production of cheese, the milk is mixed with rennet in a cheese vat in order to cause the milk to coagulate. If hard cheese species are to be produced, the coagulated mass is disintegrated by being broken down into small cubes which are further disintegrated by being stirred while the whey is separated, so that a mixture of curd and whey is obtained in the cheese vat. The cheese mass thus obtained is then transferred into cheese molds in which it is formed, whereupon the molds containing the cheese mass are placed in a cheese press in which the cheese mass is pressed into cheese cakes.

If the curds formed by disintegration and stirring settle in the cheese vat before the whey is drained off, they agglomerate without immission of air, and they may be pressed into a compact cheese mass below the whey level. This mass is divided into loafs corresponding to the cheese molds, which loafs are transferred into the molds in which they are pressed so as to obtain cheese with large-hole texture or plain texture.

If, on the contrary, the cheese mass is transferred into the molds after the whey has been drained off from the cheese vat, air is immixed in the cheese mass, and the cheese cakes formed and pressed therefrom will finally give a cheese with small-hole texture.

All operations in both above-mentioned methods could hitherto be carried out only by hand, which is very toilsome and time-consuming, whereby variations of the quantity of the final product and appreciable losses could not always be avoided.

The present invention relates to a method and apparatus for producing cheese in which the aforesaid operations are carried out fully mechanically and in a shorter time as well as with better results as far as the uniformity of the quality of the final product is concerned, and with less losses than was possible heretofore.

According to the invention, the cheese mass is fed into a centrifuge rotor in which the cheese mass is formed and pressed into cheese cakes under the action of the centrifugal force. More particularly, a mixture of curds and whey is fed, as by pumping from a cheese vat, into the centrifuge rotor moving at a comparatively low rotational speed and is distributed into cheese molds arranged at the periphery of the rotor, whereupon the supply of mixture is interrupted after the molds have been filled with the required quantity of cheese mass and the rotational speed of the centrifuge is increased until a predetermined intensity of centrifugal force is reached. This rotational speed is thereafter essentially maintained until the pressing of the cheese cakes has been achieved, and the whey is separated from the mixture and discharged.

In order to increase, during the centrifugation, the pressure action of the centrifugal force on the cheese cakes, the surfaces of the latter which are directed toward the center of rotation can be further loaded by the pressure of weights, springs or other pressure devices.

While the cheese mass is filled and formed in the cheese molds, the whey may be discharged from the centrifuge so that its level in the centrifuge rotor is kept above the top of the cheese molds, so that the filling and forming occurs while the forms are entirely surrounded by whey and without any air becoming mixed into the cheese mass, whereby a cheese with large-hole structure or a plain structure is obtained. Alternatively, the whey may be discharged so that its level in the centrifuge remains below the bottom of the cheese molds, seen from the center of the centrifuge, whereby air becomes mixed into the cheese mass and a cheese with small-hole texture is obtained.

Figure 2:
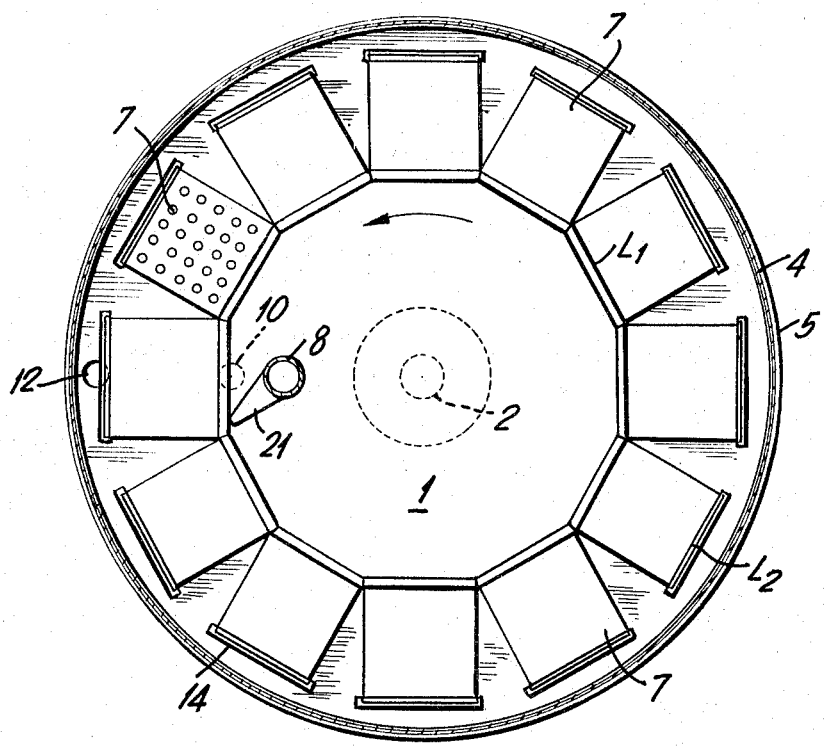
Figure 3:
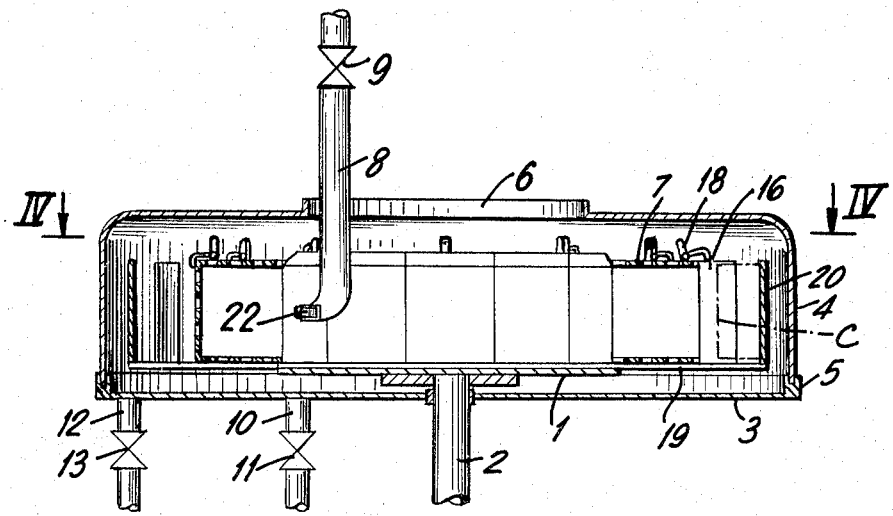
Figure 4:
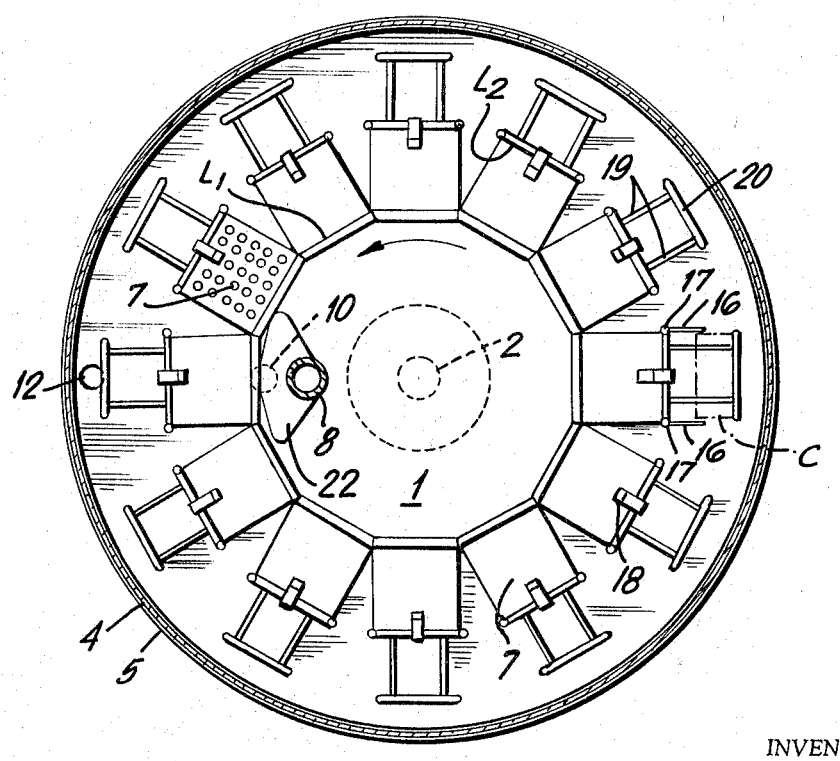

For a better understanding of the invention, reference may be had to the accompanying drawings illustrating apparatus made according to the invention for use in carrying out the new method. In the drawings, FIG. 1 is a vertical sectional view of one form of the apparatus; FIG. 2 is a horizontal sectional view along the line II—II in FIG. 1; FIG. 3 is a vertical sectional view of another form of the apparatus; and FIG. 4 is a horizontal section along the line IV—IV in FIG. 3.

The apparatus comprises a centrifuge rotor 1 secured to a rotor shaft 2 and surrounded by a casing consisting essentially of two parts 3 and 4, which can be taken apart and reassembled and maintained tightly against each other by means of bolts and fly nuts, tension hooks or the like (not shown on the drawing) provided at the periphery of the casing, as in the zone designated by 5 in FIGS. 1 and 3. An access opening 6 is provided in the top of the casing.

The shaft 2 of the centrifuge rotor is journalled on the casing 3, 4, as on the part 3 indicated in FIGS. 1 and 3, whereby the rotor will, during centrifugation, rotate in the stationary casing. The rotor shaft 2 may alternatively be firmly secured to the casing 3, 4, so that the latter will rotate together with the rotor during the centrifugation process.

The apparatus also comprises means 8 for supplying the centrifuge rotor with the product to be separated, in the present case a mixture of curds and whey, and means 10 and 12 for discharging a separated phase, in the present case whey. The supply means includes a valve 9.

The centrifuge rotor is provided at its periphery with open perforated containers, so-called cheese molds 7, the openings of which are directed toward the central axis of the rotor. The cheese molds 7 are firmly or detachably secured on the centrifuge rotor and their openings are preferably equally distant from the rotor axis and placed close to each other, so that each opening has one edge adjoining to an edge of the adjacent opening. In the embodiment described, the cheese molds 7 have a rectangular cross-section, but they may be provided with other cross-sections and with straight or circular edges, wherbey the opening of each cheese mold is in shape of a funnel.

The side-walls and preferably also the bottom of the cheese molds 7 are perforated, the size of the perforations, of course, being such that they let the separated whey escape but not the curds or the cheese mass.

The supply means 8 are preferably stationary so that, for determined values of the rotational speed of the centrifuge rotor 1 and of the supply rate of curd and whey mixture, a determined quantity of mixture is delivered through the opening of each mold 7 as it passes in front of the discharge end 21 or 22 of supply means 8. However, to make it possible to keep this filling quantity at a determined value in case the rotational speed of the rotor must be changed for any reason, the supply means 8 can rotate in the same direction as the rotor or in the opposite direction.

The means 10 and 12 for the discharge of the whey from the rotor are constituted by pipes connected to openings in the casing 3, 4, preferably in the part 3. Pipe 10 is located radially inward from the radial level $L_1$ of the mold openings, and pipe 12 is located radially outward from the radial level $L_2$ of the outer most walls of the molds. The pipes 10 and 12 are provided with valves 11 and 13 intended to shut off or control the through-flow.

If valve 13 is kept shut and valve 11 is kept open while the mixture of curds and whey is fed into the centrifuge rotor 1, the separated whey will fill the casing 3, 4 from the periphery towards the center of the rotor, up to the opening of pipe 10, whereby any further supplied whey will be discharged through pipe 10. The cheese molds and consequently the cheese mass contained in them will therefore be entirely surrounded by whey so that no air is mixed into the cheese mass while it is filled and formed, whereby the final cheese product will have a large-hole or plain texture.

If, on the other hand, the valve 13 (as well as the valve 11) is kept open while the mixture of curds and whey is fed into the centrifuge rotor 1, the whey is discharged through the pipe 12 (and 10) as it is separated, so that air gets mixed into the cheese mass being filled and formed, which results in a final cheese product with small-hole texture.

In the illustrated embodiments of the apparatus, the rotor shaft 2 is journalled in the casing 3, 4 so that the latter as well as the discharge means 10 and 12 always remain stationary, whereby no special arrangements are required for the outlets of the discharge means 10 and 12.

If, on the other hand, the rotor shaft 2 is firmly secured to the casing 3, 4 so that the latter as well as the discharge means 10 and 12 rotate together with the rotor, the outlets of the discharge means 10 and 12 are preferably arranged so as to open into a stationary funnel or the like (not shown) concentrically surrounding the rotor shaft.

In order that the cheese cakes can be easily removed from the cheese molds 7 after having been pressed, the radially outermost wall of each mold may be a plate 15 which can slide in a frame 14 of the mold, as shown in FIGS. 1 and 2. Alternatively, this outermost wall of the mold may be constituted by one or more plates 16 hinged at 17 on the mold, as shown in FIGS. 3 and 4, these plates being normally held shut by releasable locking means such as bolts 18.

Although shown only in FIGS 3 and 4, each cheese mold 7 is preferably provided with a stopping device 20 located radially outward from the radially outermost wall of the cheese mold. Each stop 20 is firmly secured to the centrifuge rotor 1, as by means of radial guide rails 19 on which a pressed cheese cake C (indicated by dot-dash lines at the right-hand side in FIG. 3 and FIG. 4) can glide outward against the stop. Rotation of the centrifuge rotor 1 is arrested at the end of the pressing operation and the outermost walls 15 or 16 of the cheese molds are then opened, whereby the cheese cakes C may be ejected centrifugally from the molds and against the stops 20 by simply restarting the rotor 1. The cheese cakes may then be removed from the stops 20 after again arresting the rotation of rotor 1, whereby the apparatus is ready for a new operating cycle.

I claim:

1. In the production of cheese cakes from a mixture of curds and whey, the method comprising the steps of feeding said mixture into cheese molds carried by a centrifugal rotor and therein forming and pressing the curds into cheese cakes under the action of centrifugal force, and removing said cakes radially through outer parts of said molds.

2. Apparatus for producing cheese cakes, comprising a centrifuge rotor having a rotational axis, a casing surrounding said rotor, the rotor including perforated molds located at the peripheral portion of the rotor and each having an inlet opening directed toward said axis, means for supplying a mixture of curds and whey to the molds through their inlet openings, each said cheese mold having a movable wall to permit discharge of a pressed cheese cake from the mold, and means for discharging centrifugally separated whey from said casing.

3. Apparatus according to claim 2, in which said movable wall is the radially outermost wall of the mold to permit discharge of a cheese cake from the mold under the action of centrifugal force while the rotor is rotating.

4. Apparatus according to claim 2, in which said movable wall is a plate slidably mounted on the mold.

5. Apparatus according to claim 2, in which said movable wall includes a plate hinged on the mold.

6. Apparatus according to claim 2, in which said movable wall is the radially outermost wall of the mold to permit discharge of a cheese cake from the mold under the action of centrifugal force while the rotor is rotating, the apparatus comprising also a stop fixed to the rotor and located radially outward from said outermost wall of each mold.

7. Apparatus according to claim 2, in which said supply means include a pipe having a dischrage end located in the rotor and facing outward toward said mold openings.

8. Apparatus according to claim 2, in which said supply means are stationary.

9. In the production of cheese cakes from a mixture of curds and whey, the method comprising the steps of feeding said mixture into cheese molds carried by a centrifugal rotor, the rotor being rotated at relatively low speed during said feeding, forming and pressing the curds into cheese cakes in said molds under the action of centrifugal force, interrupting said feeding and, during said interruption, rotating the rotor at increased speed to complete the pressing of said cakes and drain whey therefrom.

10. In the production of cheese cakes from a mixture of curds and whey, the method comprising the steps of feeding said mixture into cheese molds carried by a centrifugal rotor, forming and pressing the curds into cheese cakes in said molds under the action of centrifugal force, and maintaining the curds, during said forming and pressing, in a body of whey drained from the curds under the action of said centrifugal force.

11. In the production of cheese cakes from a mixture of curds and whey, the method comprising the steps of feeding said mixture into cheese molds carried by a centrifugal rotor, and forming and pressing the curds into cheese cakes in said molds under the action of centrifugal force, said forming and pressing being effected while continuously removing from the curds the whey drained therefrom under the action of said centrifugal force.

12. Apparatus for producing cheese cakes, comprising a centrifuge rotor having a rotational axis, a casing surrounding said rotor, the rotor including perforated molds located at the peripheral portion of the rotor and each having an inlet opening directed toward said axis, means for supplying a mixture of curds and whey to the molds through their inlet openings, and means for discharging centrifugally separated whey from said casing, said discharge means including two pipes opening into said casing at different radial distances from said axis, one of said pipes opening into the casing radially inward from the radial level of said mold openings, and the other pipe opening into the casing radially outward from the radial level of the radially outermost walls of the molds, and a valve in said other pipe.

References Cited by the Examiner

UNITED STATES PATENTS

| | | | |
|---|---|---|---|
| 124,197 | 3/1872 | Donner et al. | 210—361 X |
| 221,806 | 11/1879 | Goubert | 210—361 X |
| 2,387,276 | 10/1945 | Link | 99—243 |
| 2,808,935 | 10/1957 | Sisley | 210—361 |
| 3,011,646 | 12/1961 | Boronkay | 210—361 |

FOREIGN PATENTS 1,114,744  10/1961  Germany.

SAMUEL KOREN, *Primary Examiner.*

ALDRICH F. MEDBERY, *Examiner.*